UNITED STATES PATENT OFFICE.

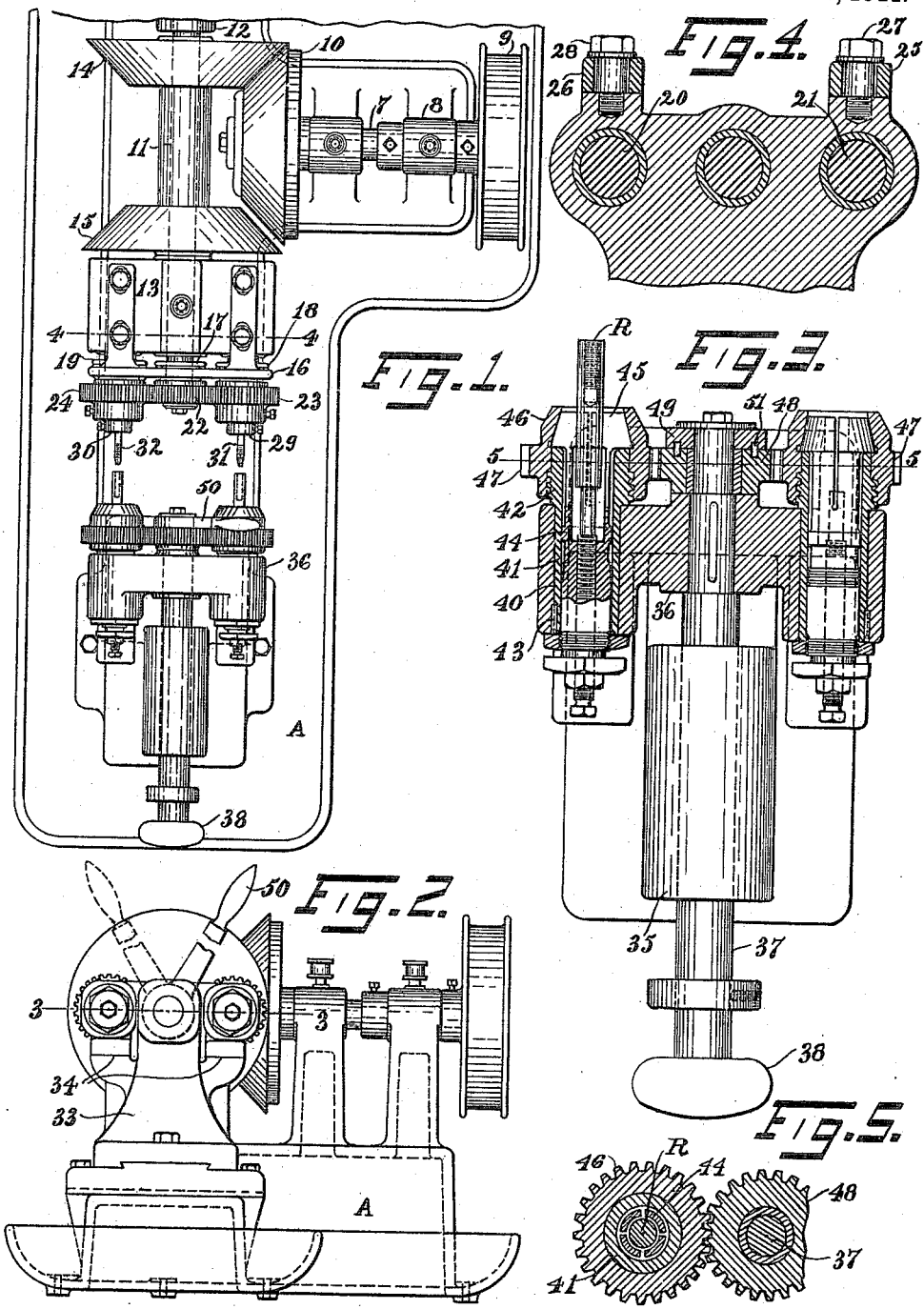

OSCAR A. SMITH, OF CLEVELAND, OHIO, ASSIGNOR TO THE NATIONAL-ACME MANUFACTURING COMPANY, OF CLEVELAND, OHIO, A CORPORATION OF OHIO.

TAPPING-MACHINE.

986,094.          Specification of Letters Patent.     Patented Mar. 7, 1911.

Application filed August 25, 1909. Serial No. 514,492.

*To all whom it may concern:*

Be it known that I, OSCAR A. SMITH, a citizen of the United States, residing in Cleveland, in the county of Cuyahoga and State of Ohio, have invented certain new and useful Improvements in Tapping-Machines, of which the following is a specification.

This invention relates to devices known as friction tapping machines, wherein the taps or dies are mounted to rotate in one direction when the work is pushed against them, and when the work is withdrawn the rotation of the taps or dies is reversed so that the work will run off the tool.

The object of the invention is to provide an improved form of work holder that is slidable to and from the taps or dies, and which is provided with means whereby the work can be very quickly gripped and released.

In the accompanying drawings showing one embodiment of my invention, Figure 1 shows the machine in plan. Fig. 2 is an end elevation of the same. Fig. 3 is a horizontal section on the line 3—3 indicated in Fig. 2 somewhat enlarged. Fig. 4 is a vertical section on the line 4—4 of Fig. 1 enlarged; and Fig. 5 is a partial section taken on the line 5—5 of Fig. 3.

The machine is shown as comprising a frame A having a driving shaft 7 mounted in bearings 8 and driven by a pulley 9. The shaft 7 carries a bevel friction wheel 10 at one end. A shaft 11 is mounted in bearings 12 and 13 and has bevel friction wheels 14 and 15 secured thereon. This shaft is endwise movable to alternately bring these bevel wheels into engagement with the friction wheel 10, whereby the rotation of the shaft from the driving shaft 7 will be reversed. A yoke 16 carries a bearing 17 for the shaft 11, and also carries bearing sleeves 18 and 19 for spindles 20 and 21. A gear 22 fast on shaft 11 meshes with gears 23 and 24 fast on spindles 20 and 21 whereby the latter will be rotated. The yoke has slotted guide arms 25 and 26 through which pass bolts 27 and 28 screwed into the bearing member 13. The spindles 20 and 21 have suitable chucks 29 and 30 for holding taps 31 and 32; but of course dies or other tools can be held by these chucks. The mechanism above described is the form at present in use.

The present invention provides an improved form of slide or holder for quickly gripping and releasing work to be fed up to the tools, and withdrawn therefrom upon completion of the operation. On the bed A is mounted a holder 33 that has a socket 35 in which slides the handle rod 37 that may have a knob 38 at the rear end for grasping. On each side of the guide portion 36 is mounted a gripping device for holding work in alinement with the taps or dies. These being identical, the description of one will answer for both.

The slide 36 has a bore 40 in which is mounted a sleeve 41 having at its front extremity an enlarged threaded portion 42, which sleeve is suitably secured in the slide against turning by key 43. A spring collet 44 is inserted in the sleeve 41, and has its split end 45 made conical as shown. A conical jaw member 46 is internally screw-threaded to engage the threaded portion of the sleeve 41, whereby turning of the jaw member will cause its conical bore to engage the collet and contract the split end to grip a rod R or other stock that may be inserted therein. Turning of the jaw in the opposite direction will serve to loosen the collet and release the work. The jaw member on each side is provided with a gear portion 47, that meshes with a gear 48 secured to the sleeve portion 49 of a handle member 50 by pins 51 that swing on the rod 37. From this it will be seen that when the handle 49 is swung in one direction the gears will turn the jaw members to open the chucks, when the stock pieces can be inserted. Then swinging the handle in the opposite direction will turn the jaw members to engage the collet and tightly clamp the work in the clutches. By this means the stock can be very quickly gripped and released, and without the use of any tools. The advancement of the guide portion 36 will bring the work pieces in the chuck into engagement with the taps or dies, and two friction wheels 11 and 15 will be brought into engagement to operate the taps. When the thread has been cut the withdrawal of the guide portion will pull on the taps and bring the friction wheels 11 and 14 into engagement causing reversal of the taps, that will be thereby withdrawn from the work.

Having thus described my invention, I claim:

1. In a tapping machine, the combination with the means for holding and rotating the threading tools, of a holder, chucks carried by the holder and arranged to grip the stock and hold it in alinement with said tools whereby advancement of the holder will cause the work to engage said tools, a shiftable handle on the holder and means connecting the chucks with the handle whereby movement of the handle in one direction will cause the work to be grasped by the chucks and the reverse movement will cause the chucks to release the work.

2. In a tapping machine, the combination with the means for holding and rotating the threading tools, of a holder shiftable to and from the tools, a pair of spindles in the holder, a pair of collets carried by the holder and having screw threads on their outside portion, conical jaw members arranged to engage the split ends of the collets, the jaw members having internal threads engaging the threads of the collets whereby relative rotation will cause engagement of the jaws with the ends of the collets to compress them, and a handle member connected with the jaw members to cause them to oscillate and expand or contract the collets.

3. In a tapping machine, the combination with the means for holding and rotating the tools, of a holder shiftable to and from the tools, a pair of spindles in the holder, a pair of collets carried by the holder and having screw threads on their outside portion, conical jaw members arranged to engage the split ends of the collets, the jaw members having internal threads engaging the threads of the collets whereby relative rotation will cause engagement of the jaws with the ends of the collets to compress them, said jaws having gear teeth on their periphery, a spindle in the holder mounted to swing, a gear on the spindle engaging both said gears on the jaws, and a handle connected with the spindle to rock it and the gears to open and close the collets.

OSCAR A. SMITH.

Witnesses:
E. E. WOOLGAR,
W. S. CHASE.

Copies of this patent may be obtained for five cents each, by addressing the "Commissioner of Patents, Washington, D. C."